(12) United States Patent
Ikegami et al.

(10) Patent No.: US 11,884,576 B2
(45) Date of Patent: Jan. 30, 2024

(54) DISPLAY COVER MEMBER AND PRODUCTION METHOD THEREFOR

(71) Applicant: NIPPON ELECTRIC GLASS CO., LTD., Otsu (JP)

(72) Inventors: Koji Ikegami, Otsu (JP); Tomohiro Nagakane, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 378 days.

(21) Appl. No.: 15/755,563

(22) PCT Filed: Sep. 7, 2016

(86) PCT No.: PCT/JP2016/076327
§ 371 (c)(1),
(2) Date: Feb. 27, 2018

(87) PCT Pub. No.: WO2017/043538
PCT Pub. Date: Mar. 16, 2017

(65) Prior Publication Data
US 2018/0251398 A1 Sep. 6, 2018

(30) Foreign Application Priority Data
Sep. 11, 2015 (JP) ................................. 2015-179318

(51) Int. Cl.
*C03C 21/00* (2006.01)
*C03C 17/23* (2006.01)
(Continued)

(52) U.S. Cl.
CPC ............ *C03C 17/25* (2013.01); *C03C 21/002* (2013.01); *G02B 5/0221* (2013.01);
(Continued)

(58) Field of Classification Search
CPC .. G02B 5/0221; G02B 5/0226; G02B 5/0294; G02B 1/11; G02B 1/118
See application file for complete search history.

(56) References Cited

U.S. PATENT DOCUMENTS

2003/0234460 A1* 12/2003 Hayashi ............... G02B 5/0278
264/2.7
2009/0197048 A1* 8/2009 Amin ..................... C03C 3/085
428/142
(Continued)

FOREIGN PATENT DOCUMENTS

CN 103718067 A 4/2014
CN 103733094 A 4/2014
(Continued)

OTHER PUBLICATIONS

Official Communication issued in International Patent Application No. PCT/JP2016/076327, dated Nov. 15, 2016.
(Continued)

*Primary Examiner* — Laura A Auer
(74) *Attorney, Agent, or Firm* — Keating & Bennett, LLP

(57) ABSTRACT

Provided is a display cover member that enables realization of a display having less reflection of the background and excellent anti-sparkle properties. The display cover member has a feature that: one of principal surfaces is formed of an uneven surface; a mean width of roughness profile elements (RSm) of the uneven surface defined by JIS B 0601-2013 is not less than 1 μm and not more than 30 μm; and a ratio θ/Rku between an average inclined angle (θ) of the roughness profile of the uneven surface and a kurtosis of the roughness profile (Rku) of the uneven surface defined by JIS B 0601-2013 is not less than 0.40° and not more than 1.08°.

11 Claims, 1 Drawing Sheet

(51) Int. Cl.
G02B 1/11 (2015.01)
G02F 1/01 (2006.01)
C03C 17/25 (2006.01)
G02B 5/02 (2006.01)
G02F 1/1333 (2006.01)
G09F 9/00 (2006.01)
C03C 23/00 (2006.01)

(52) U.S. Cl.
CPC ......... G02B 5/0294 (2013.01); G02F 1/1333 (2013.01); G09F 9/00 (2013.01); *C03C 23/007* (2013.01); *C03C 2217/213* (2013.01); *C03C 2217/73* (2013.01); *C03C 2217/77* (2013.01); *C03C 2217/948* (2013.01); *C03C 2218/32* (2013.01); *G02F 1/13338* (2013.01)

(56) References Cited

U.S. PATENT DOCUMENTS

| | | | |
|---|---|---|---|
| 2009/0244710 | A1 | 10/2009 | Tsuno et al. |
| 2010/0028600 | A1 | 2/2010 | Kojima et al. |
| 2010/0246011 | A1* | 9/2010 | Ohishi ................. C07D 281/18 359/580 |
| 2010/0246016 | A1 | 9/2010 | Carlson et al. |
| 2011/0062849 | A1 | 3/2011 | Carlson et al. |
| 2011/0267697 | A1 | 11/2011 | Kohli et al. |
| 2014/0146454 | A1* | 5/2014 | Nozawa ................. G06F 3/044 361/679.01 |
| 2014/0247495 | A1 | 9/2014 | Honda et al. |
| 2015/0177425 | A1* | 6/2015 | Kondo ................. G02B 5/0226 428/149 |
| 2015/0260882 | A1* | 9/2015 | Furui ................. G06F 3/0412 345/173 |

FOREIGN PATENT DOCUMENTS

| | | | | |
|---|---|---|---|---|
| JP | 2006-103030 | A | 4/2006 | |
| JP | 2009-104076 | A | 5/2009 | |
| JP | 2010-064932 | A | 3/2010 | |
| JP | 2010-70445 | A | 4/2010 | |
| JP | 2012-521958 | A | 9/2012 | |
| JP | 2013-47749 | A | 3/2013 | |
| JP | 2013-61636 | A | 4/2013 | |
| JP | 2016-18068 | A | 2/2016 | |
| KR | 10-2009-0104712 | A | 10/2009 | |
| WO | 2007/111026 | A1 | 10/2007 | |
| WO | WO-2014020836 | A1 * | 2/2014 | .......... G02B 5/0226 |
| WO | 2014/119453 | A1 | 8/2014 | |
| WO | 2015/050274 | A1 | 4/2015 | |
| WO | 2015/095288 | A2 | 6/2015 | |
| WO | 2015/137196 | A1 | 9/2015 | |

OTHER PUBLICATIONS

Ikegami et al., "Display Cover Member and Production Method Therefor", U.S. Appl. No. 16/432,183, filed Jun. 5, 2019.
Official Communication issued in European Patent Application No. 16844399.2, dated Mar. 22, 2019.
Official Communication issued in Chinese Patent Application No. 201680034719.4, dated Mar. 2, 2020.
Official Communication issued in corresponding Korean Patent Application No. 10-2017-7035668, dated Dec. 9, 2022.

* cited by examiner

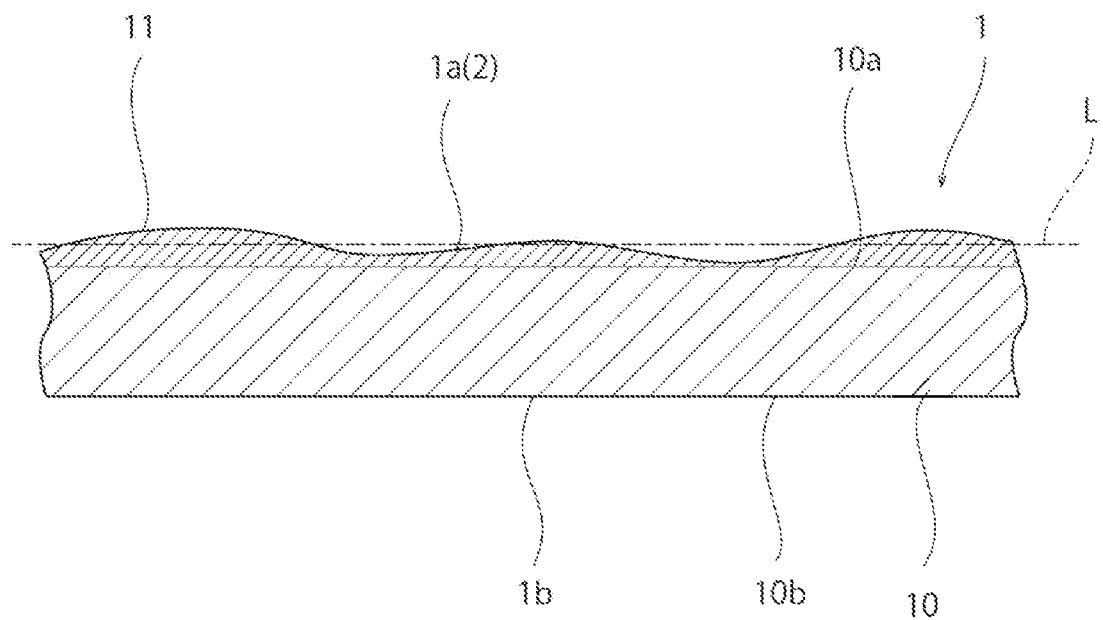

DISPLAY COVER MEMBER AND PRODUCTION METHOD THEREFOR

TECHNICAL FIELD

The present invention relates to a display cover member having less reflection of the background and excellent anti-sparkle properties and a production method therefor.

BACKGROUND ART

With the aim of reducing the reflection of the background on the surface of a display, it has been proposed in the past to dispose a cover member including an anti-glare (AG) layer in the front of the display (see, for example, Patent Literature 1).

CITATION LIST

Patent Literature

[PTL 1]
JP-A-2012-521958

SUMMARY OF INVENTION

Technical Problem

From the viewpoint of reducing the reflection of the background on the surface of the cover member, it is preferred to increase the surface roughness of the anti-glare layer so as to increase the haze of the cover member. However, in a display in the front of which a high-haze cover member is disposed, there arises a problem of the occurrence of so-called "sparkling" in which the pixels of the display and the surface irregularities of the cover member interfere with each other to produce a luminance distribution and thus make the display screen less visible. Therefore, it is desirable to prevent the occurrence of sparkling while reducing specular reflection to reduce the reflection of the background.

A principal object of the present invention is to provide a display cover member that enables realization of a display having less reflection of the background and excellent anti-sparkle properties.

Solution to Problem

A first display cover member according to the present invention has a feature that: one of principal surfaces is formed of an uneven surface; a mean width of roughness profile elements (RSm) of the uneven surface defined by JIS B 0601-2013 is not less than 1 μm and not more than 30 μm; and a ratio θ/Rku between an average inclined angle (θ) of the roughness profile of the uneven surface and a kurtosis of the roughness profile (Rku) of the uneven surface defined by JIS B 0601-2013 is not less than 0.40° and not more than 1.08°.

A second display cover member according to the present invention has a feature that: one of principal surfaces is formed of an uneven surface; a mean width of roughness profile elements (RSm) of the uneven surface defined by JIS B 0601-2013 is not less than 1 μm and not more than 30 μm; an average inclined angle (θ) of the roughness profile of the uneven surface is not less than 1.2° and not more than 7.0°; and a kurtosis of the roughness profile (Rku) of the uneven surface defined by JIS B 0601-2013 is not less than 2.2 and not more than 10.

The first or second display cover member according to the present invention preferably has a haze of not less than 1% and not more than 50%.

In the first or second display cover member according to the present invention, an arithmetic mean roughness (Ra) of the uneven surface defined by JIS B 0601-2013 is preferably not less than 0.04 μm and not more than 0.25 μm.

In the first or second display cover member according to the present invention, an absolute value |Rsk| of a skewness of the roughness profile (Rsk) of the uneven surface defined by JIS B 0601-2013 is preferably 2 or less.

The first or second display cover member according to the present invention preferably includes a light-transmissive plate and a coating film that covers at least a portion of a principal surface of the light-transmissive plate and forms the uneven surface.

In the first or second display cover member according to the present invention, the coating film preferably covers a whole of the principal surface of the light-transmissive plate.

In the first or second display cover member according to the present invention, the coating film is preferably formed of an inorganic film.

In the first or second display cover member according to the present invention, a pencil hardness of the coating film defined by JIS K 5600-5-4-1999 is 6H or more.

In the first or second display cover member according to the present invention, the light-transmissive plate is preferably formed of a glass plate.

In the first or second display cover member according to the present invention, the glass plate is preferably formed of a strengthened glass plate.

A production method for a display cover member according to the present invention is a method for producing the above-described first or second display cover member and includes forming, by spraying on a light-transmissive plate, a coating film forming the uneven surface.

In the method for producing the display cover member according to the present invention, preferably, the light-transmissive plate is formed of a glass plate, and after the coating film is formed on the glass plate, the glass plate is chemically strengthened.

In the method for producing the display cover member according to the present invention, a strengthened glass plate is preferably used as the light-transmissive plate.

Advantageous Effects of Invention

The present invention can provide a display cover member that enables realization of a display having less reflection of the background and excellent anti-sparkle properties.

BRIEF DESCRIPTION OF DRAWINGS

FIG. 1 is a schematic cross-sectional view of a display cover member according to an embodiment of the present invention.

DESCRIPTION OF EMBODIMENTS

Hereinafter, a description will be given of examples of preferred embodiments of the present invention. However, the following embodiments are simply illustrative. The present invention is not at all limited to the following embodiments.

FIG. 1 is a schematic cross-sectional view of a display cover member 1 according to an embodiment of the present invention. The display cover member 1 is a member for use in a state where it is disposed in the front of a display. Specifically, the display cover member 1 is used in a state where it is provided on the display so that its first principal surface 1a faces outward (toward the viewer) and the second principal surface 1b faces inward. The display cover member 1 may be, for example, a member forming a front plate of the display or a member provided on the front plate.

The first principal surface 1a of the display cover member 1 is formed of an uneven surface 2.

Specifically, in this embodiment, the display cover member 1 includes a light-transmissive plate 10 and a coating film 11. However, in the present invention, the display cover member 1 may be formed of a single transparent member having an uneven surface.

The mean width of roughness profile elements (RSm) of the uneven surface 2 defined by JIS B 0601-2013 is not less than 1 µm and not more than 30 µm. When RSm is within the above range and sufficiently smaller than the pixel size (about 60 to about 100 µm) of the display, a display having excellent anti-sparkle properties can be realized. RSm is preferably 3 µm or more, more preferably 5 µm or more, still more preferably 8 µm or more, and particularly preferably 10 µm or more. If RSm is too small, the width of convexities of the irregularities becomes small, so that the durability (abrasion resistance) of the surface may decrease. On the other hand, RSm is preferably 25 µm or less, more preferably 22 µm or less, still more preferably 20 µm or less, and particularly preferably 18 µm or less. If RSm is too large, the display is likely to sparkle.

The average inclined angle (θ) of the roughness profile of the uneven surface 2 is an index representing the mean slope of the uneven surface 2. As θ is smaller, the display tends to be more likely to reflect the background. Note that the average inclined angle (θ) is defined by the following formula (1):

Average Inclined Angle (θ)=tan$^{-1}$Δa    (1)

In formula (1), Δa is, as shown by formula (2) below, a value obtained by dividing, with reference to a sampling length 1 of the roughness profile defined by JIS B 0601-2013, the sum (h1+h2+h3...+hn) of the absolute values of the differences (heights h) between adjacent pairs of profile peaks and profile valley bottoms by the sampling length 1:

Δa=(h1+h2+h3 ... +hn)/1    (2)

The average inclined angle (θ) can be measured specifically in the following manner.

The surface heights of the uneven surface 2 are measured along one direction by scanning the uneven surface 2 along the one direction by laser or a stylus. The length (measurement length) along the one direction along which this height measurement is performed can be set at, for example, about 200 µm to about 350 µm. The height measurement can be performed, for example, at 0.5 µm intervals.

Next, a center line L is determined. Specifically, a center line L passing through the mean value of the heights of the roughness profile of the uneven surface is determined.

Next, the absolute values of the magnitudes of angles formed between the uneven surface 2 and the center line L are measured at 0.5 µm intervals. Then, the absolute values of the magnitudes of angles formed between the uneven surface 2 and the center line L, which have been measured at 0.5 µm intervals, are averaged out and the average inclined angle (θ) can be thus calculated.

In one embodiment of the present invention, the average inclined angle (θ) of the roughness profile of the uneven surface 2 is preferably 1.2° or more, more preferably 1.5° or more, still more preferably 1.8° or more, and particularly preferably 2° or more. If θ is too small, the display tends to be likely to reflect the background. On the other hand, θ is preferably 7° or less, more preferably 5° or less, still more preferably 4° or less, and particularly preferably 3° or less. If θ is too large, the display resolution tends to decrease.

The kurtosis of the roughness profile (Rku) of the uneven surface 2 defined by JIS B 0601-2013 is an index representing the peakedness of the bottoms and tops of the concavities and convexities. As Rku is larger, the number of pointed tops and bottoms of the concavities and convexities increases, so that the slope angles near the bottoms and tops of the concavities and convexities increase, but the slope angles of the other portions decrease, so that the display tends to be more likely to reflect the background. Furthermore, as Rku is smaller, the number of flat bottoms and tops of the concavities and convexities increases, so that the slope angles at the bottoms and tops of the concavities and convexities decrease and, therefore, the display tends to be more likely to reflect the background. In the one embodiment of the present invention, Rku is preferably 1 or more, more preferably 1.5 or more, still more preferably 2 or more, and particularly preferably 2.2 or more. If Rku is too small, the display tends to be likely to reflect the background. On the other hand, Rku is preferably 10 or less, more preferably 8 or less, still more preferably 6 or less, and particularly preferably 4 or less. If Rku is too large, the display resolution tends to decrease.

In the one embodiment of the present invention, the ratio θ/Rku between the average inclined angle (θ) of the roughness profile of the uneven surface 2 and the kurtosis of the roughness profile (Rku) of the uneven surface 2 defined by JIS B 0601-2013 is 0.40° or more, preferably 0.5° or more, and more preferably 0.6° or more. If θ/Rku is too small, the display tends to be likely to reflect the background. On the other hand, θ/Rku is 1.08° or less, preferably 1.0° or less, more preferably 0.95° or less, and particularly preferably 0.9° or less. If θ/Rku is too large, the display tends to be likely to reflect the background.

In another embodiment of the present invention, θ is 1.2° or more, preferably 1.5° or more, more preferably 1.8° or more, and particularly preferably 2° or more. If θ is too small, the display tends to be likely to reflect the background. On the other hand, θ is 7° or less, preferably 5° or less, more preferably 4° or less, and particularly preferably 3° or less. If θ is too large, the display resolution tends to decrease.

In the other embodiment of the present invention, Rku is 2.2 or more, preferably 2.3 or more, and particularly preferably 2.5 or more. If Rku is too small, the display tends to be likely to reflect the background. On the other hand, Rku is 10 or less, preferably 8 or less, more preferably 6 or less, and particularly preferably 4 or less. If Rku is too large, the display resolution tends to decrease.

In the other embodiment of the present invention, the ratio θ/Rku between θ and Rku is preferably 0.40° or more, more preferably 0.5° or more, and still more preferably 0.6° or more. If θ/Rku is too small, the display tends to be likely to reflect the background. On the other hand, θ/Rku is preferably 1.08° or less, more preferably 1.0° or less, still more preferably 0.95° or less, and particularly preferably 0.9° or less. If θ/Rku is too large, the display tends to be likely to reflect the background.

The arithmetic mean roughness (Ra) of the uneven surface 2 defined by JIS B 0601-2013 is preferably 0.04 μm or more, more preferably 0.05 μm or more, and particularly preferably 0.06 μm or more. If Ra is too small, the display tends to be likely to reflect the background. On the other hand, Ra is preferably 0.3 μm or less, more preferably 0.25 μm or less, still more preferably 0.2 μm or less, and particularly preferably 0.15 μm or less. If Ra is too large, the display resolution tends to decrease.

The root mean square roughness (Rq) of the uneven surface 2 defined by JIS B 0601-2013 is preferably 0.05 μm or more, more preferably 0.06 μm or more, still more preferably 0.07 μm or more, and particularly preferably 0.08 μm or more. If Rq is too small, the display tends to be likely to reflect the background. On the other hand, Rq is preferably 0.4 μm or less, more preferably 0.3 μm or less, still more preferably 0.26 μm or less, and particularly preferably 0.2 μm or less. If Rq is too large, the display resolution tends to decrease.

The total height of the roughness profile (Rt) of the uneven surface 2 defined by JIS B 0601-2013 is preferably 0.2 μm or more, more preferably 0.3 μm or more, still more preferably 0.4 μm or more, and particularly preferably 0.5 μm or more. If Rt is too small, the display tends to be likely to reflect the background. On the other hand, Rt is preferably 3 μm or less, more preferably 2 μm or less, still more preferably 1.7 μm or less, and particularly preferably 1 μm or less. If Rt is too large, the display resolution tends to decrease.

The ten point height of the roughness profile ($Rz_{JIS}$) of the uneven surface 2 defined by JIS B 0601-2013 is preferably 0.2 μm or more, more preferably 0.3 μm or more, still more preferably 0.35 μm or more, and particularly preferably 0.4 μm or more. If $Rz_{JIS}$ is too small, the display tends to be likely to reflect the background. On the other hand, $Rz_{JIS}$ is preferably 1.6 μm or less, more preferably 1.4 μm or less, and particularly preferably 1.2 μm or less. If $Rz_{JIS}$ is too large, the display resolution tends to decrease.

The absolute value |Rsk| of the skewness of the roughness profile (Rsk) of the uneven surface 2 defined by JIS B 0601-2013 is preferably 3 or less, more preferably 2.5 or less, still more preferably 2 or less, and particularly preferably 1.5 or less. A larger |Rsk| indicates a larger asymmetry of the surface concavo-convex shape with respect to the mean line. When the asymmetry of the surface concavo-convex shape is large, this means that there are steep profile peaks and gentle profile valleys (where Rsk>0) and indicates that the slope angle distribution of the uneven surface 2 is biased. In other words, the profile peaks have large slope angles and the profile valleys have small slope angles (but the relation between the profile peaks and the profile valleys is reversed where Sk<0). In such a case, portions having small slope angles may be likely to reflect the background. Therefore, if |Rsk| is too large, the display tends to be likely to reflect the background.

The root mean square slope of the roughness profile (RΔq) of the uneven surface 2 defined by JIS B 0601-2013 is preferably 0.04 or more, more preferably 0.05 or more, and particularly preferably 0.06 or more. If RΔq is too small, the display tends to be likely to reflect the background. On the other hand, RΔq is preferably 0.17 or less, more preferably 0.18 or less, and particularly preferably 0.16 or less. If RΔq is too large, the display resolution tends to decrease.

The haze is the proportion of the diffuse light transmission to the total light transmission. Therefore, the diffuse light transmission can be reduced by decreasing the haze. Thus, a high resolution can be achieved. The haze of the display cover member 1 is preferably 1% or more, more preferably 2% or more, still more preferably 3% or more, and particularly preferably 5% or more. The haze in the present invention refers to the value measured by the method conforming to JIS K 7136-2000. If the haze is too small, the display tends to be likely to reflect the background. On the other hand, the haze of the display cover member 1 is preferably 50% or less, more preferably 30% or less, still more preferably 20% or less, and particularly preferably 15% or less. If the haze is too large, the display resolution tends to decrease.

The gloss value of the display cover member 1 is preferably 10% or more, more preferably 20% or more, and particularly preferably 30% or more. The gloss value in the present invention refers to the value measured at an incident angle of 60° by the method conforming to JIS Z 8741-1997. If the gloss value is too small, the display resolution tends to decrease. On the other hand, the gloss value of the display cover member 1 is preferably 80% or less, more preferably 75% or less, and particularly preferably 70% or less. If the gloss value is too large, the display tends to be likely to reflect the background.

No particular limitation is placed on the material for the light-transmissive plate 10 and the transparent member so long as it can transmit light from the display. The light-transmissive plate 10 and the transparent member can be formed of, for example, a glass plate of alkali-free glass, soda-lime glass, strengthened glass or other glasses, a crystallized glass plate of $Li_2O$—$Al_2O_3$—$SiO_2$-based crystallized glass or other crystallized glasses, or a resin plate. For example, in the case where the display cover member 1 is required to have high mechanical strength, the light-transmissive plate 10 and the transparent member are preferably formed of a strengthened glass plate.

No particular limitation is placed on the thickness of the light-transmissive plate 10 and the transparent member. The thickness of the light-transmissive plate 10 and the transparent member can be, for example, about 0.01 mm to about 10 mm. Note that the light-transmissive plate 10 and the transparent member may be rigid bodies or may have flexibility. The light-transmissive plate 10 and the transparent member may have a sheet shape.

The strengthened glass plate to be suitably used as the light-transmissive plate 10 and the transparent member preferably contains as a glass composition, in % by mass, not less than 50% nor more than 80% $SiO_2$, not less than 3.5% nor more than 25% $Al_2O_3$, 15% or less $B_2O_3$, not less than 1% nor more than 20% $Na_2O$, and 10% or less $K_2O$. The reasons why the ranges of contents of the components are limited as above will be described below. Note that in the description of the ranges of contents of the components the representation in % refers to % by mass.

$SiO_2$ is a component that forms a glass network. The content of $SiO_2$ is preferably not less than 50% and not more than 80%. If the content of $SiO_2$ is too small, vitrification becomes less likely to be achieved and the coefficient of thermal expansion becomes excessively high to make the thermal shock resistance likely to decrease. Therefore, a suitable range of lower limits of the content of $SiO_2$ is preferably not less than 52% and particularly preferably not less than 55%. On the other hand, if the content of $SiO_2$ is too large, the meltability and moldability are likely to decrease. Therefore, a suitable range of upper limits of the content of $SiO_2$ is preferably not more than 75%, more preferably not more than 72%, still more preferably not more than 70%, and particularly preferably not more than 67.5%.

$Al_2O_3$ is a component that increases the ion-exchange performance and is also a component that increases the strain point and the Young's modulus. The content of $Al_2O_3$ is preferably not less than 5% and not more than 25%. If the content of $Al_2O_3$ is too small, not only the coefficient of thermal expansion becomes excessively high to make the thermal shock resistance likely to decrease, but also the ion-exchange performance may not be able to be sufficiently offered. Therefore, a suitable range of lower limits of the content of $Al_2O_3$ is preferably not less than 7%, more preferably not less than 8%, still more preferably not less than 10%, yet still more preferably not less than 12%, yet still more preferably not less than 14%, yet still more preferably not less than 15%, and particularly preferably not less than 16%. On the other hand, if the content of $Al_2O_3$ is too large, the glass becomes likely to precipitate a devitrified crystal, which makes it difficult to mold the glass plate by the overflow downdraw process or the like. Furthermore, the coefficient of thermal expansion becomes excessively low to become less likely to match the coefficient of thermal expansion of the surrounding material and the high-temperature viscosity becomes high to make the meltability likely to decrease. Therefore, a suitable range of upper limits of the content of $Al_2O_3$ is preferably not more than 22%, more preferably not more than 20%, still more preferably not more than 19%, yet still more preferably not more than 18%, and particularly preferably not more than 17%.

$B_2O_3$ is a component that decreases the high-temperature viscosity and the density, stabilizes the glass to make a crystal less likely to precipitate, and decreases the liquidus temperature. Furthermore, $B_2O_3$ is a component that increases the crack resistance. The content of $B_2O_3$ is preferably not more than 15%. If the content of $B_2O_3$ is too large, an ion exchange treatment tends to cause a surface coloration called "yake", the water resistance tends to decrease, the compressive stress value of the compressive stress layer tends to decrease, and the stress depth of the compressive stress layer tends to decrease. Therefore, a suitable range of upper limits of the content of $B_2O_3$ is preferably not more than 15%, more preferably not more than 12%, still more preferably not more than 10%, yet still more preferably not more than 8%, yet still more preferably not more than 6%, and particularly preferably not more than 5%. Note that in the case of introducing $B_2O_3$ into the glass composition, a suitable range of lower limits of the content of $B_2O_3$ is preferably not less than 0.1%, more preferably not less than 1%, still more preferably more than 1%, yet still more preferably not less than 1.5%, and particularly preferably not less than 2%.

$Na_2O$ is a principal ion-exchange component and is also a component that decreases the high-temperature viscosity to increase the meltability and moldability. Furthermore, $Na_2O$ is also a component that improves the resistance to devitrification. The content of $Na_2O$ is preferably not less than 1% and not more than 20%. If the content of $Na_2O$ is too small, the meltability is likely to decrease, the coefficient of thermal expansion is likely to decrease, and the ion-exchange performance is likely to decrease. Therefore, in the case of introducing $Na_2O$, a suitable range of lower limits of $Na_2O$ is preferably not less than 10%, more preferably not less than 11%, and particularly preferably not less than 12%. On the other hand, if the content of $Na_2O$ is too large, the coefficient of thermal expansion becomes excessively high to make the thermal shock resistance likely to decrease and make the coefficient of thermal expansion difficult to match with that of the surrounding material. Furthermore, the strain point may excessively decrease and the glass composition may lack a component balance to contrariwise decrease the resistance to devitrification. Therefore, a suitable range of upper limits of $Na_2O$ is preferably not more than 17% and particularly preferably not more than 16%.

$K_2O$ is a component that promotes ion exchange and is also a component having, among alkali metal oxides, a significant effect of increasing the stress depth of the compressive stress layer. Furthermore, $K_2O$ is a component that decreases the high-temperature viscosity to increase the meltability and moldability. Moreover, $K_2O$ is also a component that improves the resistance to devitrification. The content of $K_2O$ is preferably not more than 10%. If the content of $K_2O$ is too large, the coefficient of thermal expansion becomes excessively high to make the thermal shock resistance likely to decrease and make the coefficient of thermal expansion difficult to match with that of the surrounding material. Furthermore, the strain point tends to excessively decrease and the glass composition tends to lack a component balance to contrariwise decrease the resistance to devitrification. Therefore, a suitable range of upper limits of $K_2O$ is preferably not more than 8%, more preferably not more than 6%, still more preferably not more than 4%, and particularly preferably less than 2%.

In addition to the above components, for example, the following components may be introduced into the composition.

$Li_2O$ is an ion-exchange component and is also a component that decreases the high-temperature viscosity to increase the meltability and moldability. Furthermore, $Li_2O$ is a component that increases the Young's modulus. Moreover, $Li_2O$ has, among alkali metal oxides, a significant effect of increasing the compressive stress value. However, if the content of $Li_2O$ is too large, the liquid phase viscosity decreases, so that the glass is likely to devitrify. Furthermore, the coefficient of thermal expansion becomes excessively high to make the thermal shock resistance likely to decrease and make the coefficient of thermal expansion difficult to match with that of the surrounding material. Moreover, if the low-temperature viscosity excessively decreases and stress relaxation thus becomes likely to occur, the compressive stress value may contrariwise decrease. Therefore, a suitable range of upper limits of the content of $Li_2O$ is preferably not more than 3.5%, more preferably not more than 2%, still more preferably not more than 1%, yet still more preferably not more than 0.5%, and particularly preferably not more than 0.2%. Note that in the case of introducing $Li_2O$ into the glass composition, a suitable range of lower limits of the content of $Li_2O$ is not less than 0.01

A suitable content of $Li_2O+Na_2O+K_2O$ is 5 to 25%, both inclusive. If the content of $Li_2O+Na_2O+K_2O$ is too small, the ion-exchange performance and the meltability are likely to decrease. Therefore, a suitable range of lower limits of the content of $Li_2O+Na_2O+K_2O$ is preferably not less than 10%, more preferably not less than 15%, and particularly preferably not less than 17%. On the other hand, if the content of $Li_2O+Na_2O+K_2O$ is too large, not only the glass is likely to devitrify but also the coefficient of thermal expansion becomes excessively high to make the thermal shock resistance likely to decrease and make the coefficient of thermal expansion difficult to match with that of the surrounding material. Furthermore, the strain point may excessively decrease, so that a high compressive stress value becomes difficult to achieve. Moreover, the viscosity near the liquidus temperature may decrease, so that a high liquid phase viscosity becomes difficult to secure. Therefore, a suitable range of upper limits of the content of $Li_2O+Na_2O+K_2O$ is not more than 22%. Note that "$Li_2O+Na_2O+K_2O$" refers to the total content of $Li_2O$, $Na_2O$, and $K_2O$.

MgO is a component that decreases the high-temperature viscosity to increase the meltability and moldability and increases the strain point and the Young's modulus and is also a component having, among alkaline earth metal oxides, a significant effect of increasing the ion-exchange performance. However, if the content of MgO is too large, the density and the coefficient of thermal expansion are likely to increase and the glass is likely to devitrify. Therefore, a suitable range of upper limits of the content of MgO is preferably not more than 12%, more preferably not more than 10%, still more preferably not more than 8%, yet still more preferably not more than 5%, and particularly preferably not more than 4%. Note that in the case of introducing MgO into the glass composition, a suitable range of lower limits of MgO is preferably not less than 0.1%, more preferably not less than 0.5%, still more preferably not less than 1%, and particularly preferably not less than 2%.

CaO has, as compared to other components, a significant effect of decreasing the high-temperature viscosity to increase the meltability and moldability and increasing the strain point and the Young's modulus, without decreasing the resistance to devitrification. However, if the content of CaO is too large, the density and the coefficient of thermal expansion are likely to increase and the glass composition is likely to lack a component balance, so that the glass is contrariwise likely to devitrify and the ion-exchange performance is likely to decrease. Therefore, a suitable range of upper limits of the content of CaO is preferably not more than 5%, more preferably not more than 4%, still more preferably not more than 3%, and particularly preferably not more than 2.5%. Note that in the case of introducing CaO into the glass composition, a suitable range of lower limits of CaO is preferably not less than 0.01%, more preferably not less than 0.1%, and particularly preferably not less than 1%.

SrO is a component that decreases the high-temperature viscosity to increase the meltability and moldability and increases the strain point and the Young's modulus, without decreasing the resistance to devitrification. However, if the content of SrO is too large, the density and the coefficient of thermal expansion are likely to increase, the ion-exchange performance is likely to decrease, and the glass composition is likely to lack a component balance, so that the glass is contrariwise likely to devitrify. A suitable range of upper limits of the content of SrO is preferably not more than 5%, more preferably not more than 3%, still more preferably not more than 1%, and particularly preferably less than 0.1%.

BaO is a component that decreases the high-temperature viscosity to increase the meltability and moldability and increases the strain point and the Young's modulus, without decreasing the resistance to devitrification. However, if the content of BaO is too large, the density and the coefficient of thermal expansion are likely to increase, the ion-exchange performance is likely to decrease, and the glass composition is likely to lack a component balance, so that the glass is contrariwise likely to devitrify. A suitable range of upper limits of the content of BaO is preferably not more than 5%, more preferably not more than 3%, still more preferably not more than 1%, and particularly preferably less than 0.1%.

ZnO is a component that increases the ion-exchange performance and, particularly, a component having a significant effect of increasing the compressive stress value. Furthermore, ZnO is a component that decreases the high-temperature viscosity without decreasing the low-temperature viscosity. However, if the content of ZnO is too large, the glass tends to undergo a phase separation, the water resistance tends to decrease, the density tends to increase, and the stress depth of the compressive stress layer tends to decrease. Therefore, a suitable range of upper limits of the content of ZnO is preferably not more than 6%, more preferably not more than 5%, still more preferably not more than 1%, yet still more preferably not more than 0.5%, and particularly preferably less than 0.1%.

$ZrO_2$ is a component that significantly increases the ion-exchange performance and is also a component that increases the viscosity near the liquid phase viscosity and the strain point, but, if its content is too large, the resistance to devitrification may significantly decrease and the density may become excessively high. Therefore, a suitable range of upper limits of $ZrO_2$ is preferably not more than 10%, more preferably not more than 8%, still more preferably not more than 6%, and particularly preferably not more than 5%. Note that in order to increase the ion-exchange performance, $ZrO_2$ is preferably introduced into the glass composition, in which case a suitable range of lower limits of $ZrO_2$ is preferably not less than 0.001%, more preferably not less than 0.01%, still more preferably 0.5%, and particularly preferably not less than 1%.

$P_2O_5$ is a component that increases the ion-exchange performance and, particularly, a component that increases the stress depth of the compressive stress layer. However, if the content of $P_2O_5$ is too large, the glass is likely to undergo a phase separation. Therefore, a suitable range of upper limits of $P_2O_5$ is preferably not more than 10%, more preferably not more than 8%, still more preferably not more than 6%, yet still more preferably not more than 4%, yet still more preferably not more than 2%, yet still more preferably not more than 1%, and particularly preferably less than 0.1%.

As a fining agent, one or more components selected from the group consisting of $As_2O_3$, $Sb_2O_3$, $SnO_2$, F, Cl, and $SO_3$ (preferably the group consisting of $SnO_2$, Cl, and $SO_3$) may be introduced at a content of 0 to 30000 ppm (3%) into the composition. From the viewpoint of securely enjoying the fining effect, the content of $SnO_2+SO_3+Cl$ is preferably 0 to 10000 ppm, more preferably 50 to 5000 ppm, still more preferably 80 to 4000 ppm, yet still more preferably 100 to 3000 ppm, and particularly preferably 300 to 3000 ppm. Here, "$SnO_2+SO_3+Cl$" refers to the total content of $SnO_2$, $SO_3$, and Cl.

A suitable range of contents of $SnO_2$ is preferably 0 to 10000 ppm, more preferably 0 to 7000 ppm, and particularly preferably 50 to 6000 ppm. A suitable range of contents of Cl is preferably 0 to 1500 ppm, more preferably 0 to 1200 ppm, still more preferably 0 to 800 ppm, yet still more preferably 0 to 500 ppm, and particularly preferably 50 to 300 ppm. A suitable range of contents of $SO_3$ is preferably 0 to 1000 ppm, more preferably 0 to 800 ppm, and particularly preferably 10 to 500 ppm.

Rare-earth oxides, including $Nd_2O_3$ and $La_2O_3$, are components that increase the Young's modulus and are also components that, upon addition of a complementary color thereto, dilute their color to enable the control of the glass color. However, these materials themselves are expensive and a large amount of introduction of them makes the resistance to devitrification likely to decrease. Therefore, the content of rare-earth oxides is preferably not more than 4%, more preferably not more than 3%, still more preferably not more than 2%, yet still more preferably not more than 1%, and particularly preferably not more than 0.5%.

In the present invention, the glass composition is preferably substantially free of $As_2O_3$, F, PbO, and $Bi_2O_3$ in consideration for the environment. Here, the term "substantially free of $As_2O_3$" intends that $As_2O_3$ is not positively added as a glass component but its incorporation at an impurity level is allowed, and specifically the term means that the content of $As_2O_3$ is less than 500 ppm. The term "substantially free of F" intends that F is not positively added as a glass component but its incorporation at an impurity level is allowed, and specifically the term means that the content of F is less than 500 ppm. The term "substantially free of PbO" intends that PbO is not positively added as a glass component but its incorporation at an impurity level is allowed, and specifically the term means that the content of PbO is less than 500 ppm. The term "substantially free of $Bi_2O_3$" intends that $Bi_2O_3$ is not positively added as a glass component but its incorporation at an impurity level is allowed, and specifically the term means that the content of $Bi_2O_3$ is less than 500 ppm.

The light-transmissive plate 10 has a first principal surface 10a and a second principal surface 10b. In this embodiment, the first and second principal surfaces 10a, 10b are flat surfaces. The second principal surface 1b of the display cover member 1 is formed of the second principal surface 10b of the light-transmissive plate 10. A coating film 11 is provided on the first principal surface 10a of the light-transmissive plate 10. This coating film 11 covers at least a portion of the first principal surface 10a forming the uneven surface 2. For example, the coating film 11 may cover the whole of the first principal surface 10a or may cover a portion of the first principal surface 10a. The coating film 11 may be provided, for example, in islands. When the coating film 11 covers a portion of the first principal surface 10a, the first principal surface 1a of the display cover member 1 is formed of the coating film 11 and the first principal surface 1a.

In using the display cover member 1, for example, for a touch sensor or the like, the surface of the display cover member 1 is required to have high durability (abrasion resistance). Therefore, the coating film 11 is preferably hard. The pencil hardness of the coating film 11 defined by JIS K 5600-5-4-1999 is preferably 6H or more, more preferably 7H or more, still more preferably 8H or more, and yet still more preferably 9H or more.

The coating film 11 can be formed of, for example, an inorganic film made of an inorganic oxide, such as silicon oxide, titanium oxide, aluminum oxide or zirconium oxide. Among others, the coating film 11 is preferably made of silicon oxide.

The thickness of the coating film 11 is, for example, preferably not less than 0.1 µm and not more than 5 µm.

Note that in this embodiment a description will be given of an example where the coating film 11 is provided directly on the first principal surface 10a of the light-transmissive plate 10. However, the present invention is not limited to this structure. For example, an antireflection film or others may be provided between the coating film and the light-transmissive plate. Alternatively, an antireflection film, a transparent conductive film or others may also be provided on the second principal surface 10b of the light-transmissive plate 10.

The antireflection film may be, for example, a low-reflective index film having a lower refractive index than the light-transmissive plate 10 or a dielectric multilayer film in which low-refractive index layers having a relatively low refractive index and high-refractive index layers having a relatively high refractive index are alternately deposited. The antireflection film can be formed, for example, by a sputtering process, a CVD process or other processes.

When the light-transmissive plate 10 is used as a cover glass, the transparent conductive film functions as an electrode for a touch sensor. Examples of the transparent conductive film include a tin-doped indium oxide (ITO) film, a fluorine-doped tin oxide (FTO) film, and an antimony-doped tin oxide (ATO) film. Among them, the ITO film is preferably used because of its low electrical resistance. The ITO film can be formed by, for example, a sputtering process. On the other hand, the FTO film and the ATO film can be formed by a CVD (chemical vapor deposition) process.

In this embodiment, the coating film 11 forms the surface of the display cover member 1. However, the present invention is not limited to this structure. Another film may be further provided on top of the coating film, such as an anti-fingerprint film (AF film) for preventing contamination with fingerprints and giving water repellency and oil repellency, an antireflection film, a transparent conductive film, an anti-glare film for giving an anti-glare function to increase the visibility or increasing the writability with a touch pen or the like, or an antifouling film for preventing contamination with fingerprints and giving water repellency and oil repellency.

Note that the anti-fingerprint film (AF film) preferably contains a fluorine-containing polymer that contains silicon in its main chain. Examples of the fluorine-containing polymer include polymers that have —Si—O—Si— unit in their main chain and have a fluorine-containing, water-repellent functional group in their side chain. The fluorine-containing polymer can be synthesized, for example, by dehydrocondensation of silanol.

The transparent conductive film may be formed on the back side (the display device side, the second principal surface side) of the light-transmissive plate 10. When the light-transmissive plate 10 is used as a cover glass for the display device, the transparent conductive film functions as an electrode for a touch sensor.

Examples of the transparent conductive film include a tin-doped indium oxide (ITO) film, a fluorine-doped tin oxide (FTO) film, and an antimony-doped tin oxide (ATO) film. Among them, the ITO film is preferably used because of its low electrical resistance. The ITO film can be formed by, for example, a sputtering process. On the other hand, the FTO film and the ATO film can be formed by a CVD (chemical vapor deposition) process.

In forming an antireflection film and an AF film on the uneven surface side of the coating film 11 or the uneven surface of the transparent member, it is preferred that the antireflection film should be formed on the uneven surface and the AF film should be formed on the antireflection film.

The coating film 11 preferably contains no scattering particles unlike a particulate-dispersed film and is preferably a homogeneous film. In this case, the resolution can be further increased and the reflection of objects can be more effectively reduced.

The coating film 11 preferably has a lower refractive index than the light-transmissive plate 10. In this case, the reflection of objects can be more effectively reduced.

Next, a description will be given of an example of a production method for the display cover member 1.

First, a light-transmissive plate 10 is prepared. Next, a light-transmissive material is applied on the first principal surface 10a of the light-transmissive plate 10 by spraying and then dried to form a coating film 11. Since the coating film 11 is formed using spraying, RSm and θ/Rku can be easily adjusted within their preferred ranges.

More specifically, the formation of the coating film 11 can be conducted in the following manner. While the light-transmissive plate 10 is being conveyed in a coating chamber, a light-transmissive material is discharged toward the light-transmissive plate 10 from a nozzle scanning back and forth in a direction perpendicular to the direction of conveyance of the light-transmissive plate 10. Thereafter, the obtained applied film is dried, so that a coating film 11 can be completed. During the film formation, the interior of the coating chamber is preferably given a laminar airflow running from top down.

RSm and θ/Rku of a display cover member 1 to be produced can be adjusted, for example, by controlling the flow rate of air flowing through the nozzle, the amount of light-transmissive material discharged per unit area, the flow rate of the laminar airflow, and so on.

For example, by reducing the flow rate of air flowing through the nozzle, the mean width of roughness profile elements (RSm) can be decreased. The flow rate of air flowing through the nozzle is preferably 153 L/min or less.

For example, by reducing the ratio of the amount of application of the light-transmissive material per unit area to the flow rate of the laminar airflow, i.e., Amount of Application $(g/m^2)$/Flow Rate of Laminar Airflow $(^2/min)$, θ/Rku can be decreased. The Amount of Application $(g/m^2)$/Flow Rate of Laminar Airflow $(m^2/min)$ is, for example, preferably 0.18 or less.

For example, by reducing the ratio of the amount of application of the light-transmissive material per unit area to the flow rate of air flowing through the nozzle, i.e., Amount of Application $(g/m^2)$/Air Flow Rate $(m^2/min)$, θ/Rku can be increased. The Amount of Application $(g/m^2)$/Air Flow Rate $(m^2/min)$ is, for example, preferably 0.05 or less.

Note that in the case where the light-transmissive plate 10 is formed of a strengthened glass plate, the coating film 11 maybe formed on the strengthened glass plate, or alternatively, after the coating film 11 is formed on a glass plate, the glass plate may be strengthened by chemical strengthening or thermal tempering.

Alternatively, in the case where the display cover member 1 is formed of a single transparent member having an uneven surface, a method that can be used is to subject a principal surface of the transparent member to a surface treatment, such as frosting, sandblasting or wet blasting, thus forming desired irregularities.

The frosting is a treatment for forming irregularities on the principal surface of the transparent member by dipping the transparent member into, for example, a mixed solution of hydrogen fluoride and ammonium fluoride to chemically surface-treat the dipped surface. Particularly, frosting using hydrogen fluoride or like chemical is preferred because microcracks are less likely to be developed on the surface of a treated body and, therefore, the treated body is less likely to decrease the mechanical strength.

The sandblasting is a treatment for forming irregularities on the principal surface of the transparent member by blasting the surface of the transparent member with, for example, crystalline silicon dioxide powder or silicon carbide powder, using pressurized air. Furthermore, after the irregularities are formed in this manner, the glass surface generally undergoes chemical etching in order to arrange the surface shape. By doing so, cracks developed by sandblasting or the like can be removed. A method that can be preferably used as the etching is to dip a transparent substrate as a treated body into a solution containing hydrogen fluoride as a main component.

The wet blasting is a treatment for forming irregularities on the principal surface of the transparent member by using compressed air to blast the surface of the transparent member through spray nozzles at high speed with a slurry obtained by uniformly stirring abrasive grains formed of alumina or like solid particles and a liquid, such as water. The surface roughness of the uneven surface formed on the principal surface of the transparent member by wet blasting can be adjusted by the particle size distribution of abrasive grains mainly contained in the slurry and the blasting pressure during blasting of the transparent member with the slurry. In the wet blasting, when the slurry is sprayed toward the transparent member, the liquid carries the abrasive grains to the transparent member. Therefore, as compared to the sandblasting, fine abrasive grains can be used and the impact of the abrasive grains hitting the work can be reduced, which enables precise processing.

EXAMPLES

The present invention will be described below in more detail with reference to specific examples but the present invention is not at all limited by the following examples. Modification and variations may be appropriately made therein without changing the gist of the present invention.

Examples 1 to 9 and Comparative Examples 1 to 4

A liquid containing a silicon oxide component was applied by spraying on a flat strengthened glass plate (a flat strengthened glass plate manufactured by Nippon Electric Glass Co., Ltd. and having a thickness of 0.7 mm) and then dried to form a coating film made of silicon oxide, thus obtaining a display cover member. Detailed conditions are shown in Tables 1 and 2.

(Measurement of Parameters on Surface Properties of Uneven Surface)

Various parameters (RSm, θ, Rku, Ra, Rq, Rt, $Rz_{JIS}$, |Rsk|, and Rdq) on surface properties of the uneven surfaces of the display cover members of Examples 1 to 9 and Comparative Examples 1 to 4, all defined by JIS B 0601-2013, were measured using a non-contact surface and layer cross-section profile measurement system VertScan 2.0 (manufactured by Ryoka Systems Inc.). The results are shown in Tables 1 and 2.

(Measurement of Haze)

The hazes of the display cover members of Examples 1 to 9 and Comparative Examples 1 to 4 were measured using NDH-5000 (manufactured by Nippon Denshoku Industries Co., Ltd.) based on JIS K 7136-2000. The results are shown in Tables 1 and 2.

(Measurement of Gloss Value)

The gloss values, at an incident angle of 60°, of the display cover members of Examples 1 to 9 and Comparative Examples 1 to 4 were measured using IG-331 (manufactured by Horiba, Ltd.) based on JIS Z 8741-1997. The results are shown in Tables 1 and 2.

(Evaluation of Degree of Reflection)

With a mending tape (manufactured by 3M) applied to the back side of each display cover member, a fluorescent lamp was reflected on the uneven surface of the cover member. The uneven surfaces on which the reflected fluorescent lamp was fully blurred and imperceptible were evaluated with a double circle mark, the uneven surfaces on which the reflected fluorescent lamp was slightly perceptible but blurred were evaluated with a circle mark, the uneven surfaces on which the reflected fluorescent lamp was perceptible but slightly blurred were evaluated with a triangle mark, and the uneven surfaces on which the reflected fluorescent lamp was clearly perceptible were evaluated with a cross mark. The results are shown in Tables 1 and 2.

(Evaluation of Degree of Sparkle)

Each of the display cover members of Examples 1 to 9 and Comparative Examples 1 to 4 was placed on top of a display with a pixel pitch of 264 ppi and observed in terms of degree of sparkle. In doing so, the display cover members on which sparking was not recognizable were evaluated with a circle mark, while the display cover members on which sparkling was recognizable were evaluated with a cross mark. The results are shown in Tables 1 and 2.

(Evaluation of Pencil Hardness)

The pencil hardnesses of the coating films of the display cover members of Examples 1 to 9 and Comparative Examples 1 to 4 were measured, based on JIS K 5600-5-4-1999, under conditions of a pencil angle of 45°, a scratch speed of 100 mm/min, and a load of 750 g using a HEIDON surface property tester and a pencil HI-uni by Mitsubishi Pencil Co., Ltd. The results are shown in Tables 1 and 2.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Air Flow Rate (L/min) | 151.4 | 151.4 | 94 | 94 | 94 | 94 | 145 | 100 | 104 |
| Flow Rate of Laminar Airflow ($m^2$/min) | 26 | 26 | 52 | 52 | 52 | 52 | 52 | 52 | 52 |
| Amount of Application (g/$m^2$) | 4 | 4 | 3.5 | 3.5 | 3.5 | 3.5 | 6.8 | 3.0 | 3.0 |
| Amount of Application/ Flow Rate of Laminar Airflow | 0.154 | 0.154 | 0.067 | 0.067 | 0.067 | 0.067 | 0.131 | 0.058 | 0.058 |
| Amount of Application/ Air Flow Rate | 0.026 | 0.026 | 0.037 | 0.037 | 0.037 | 0.037 | 0.047 | 0.030 | 0.029 |
| Ra (μm) | 0.193 | 0.099 | 0.071 | 0.111 | 0.110 | 0.067 | 0.135 | 0.098 | 0.092 |
| Rq (μm) | 0.252 | 0.127 | 0.095 | 0.139 | 0.138 | 0.086 | 0.164 | 0.122 | 0.108 |
| Rt (μm) | 1.577 | 0.851 | 0.587 | 0.699 | 0.900 | 0.462 | 0.746 | 0.577 | 0.611 |
| Rz (μm) | 1.048 | 0.592 | 0.455 | 0.517 | 0.597 | 0.375 | 0.553 | 0.437 | 0.439 |
| \|Rsk\| | 1.75 | 1.21 | 0.09 | 0.40 | 0.57 | 0.07 | 0.84 | 0.82 | 0.51 |
| Rku | 6.99 | 4.71 | 3.42 | 2.95 | 3.50 | 3.02 | 3.02 | 3.01 | 2.32 |
| Rdq | 0.162 | 0.089 | 0.063 | 0.083 | 0.084 | 0.055 | 0.071 | 0.069 | 0.085 |
| RSm (μm) | 13.47 | 14.21 | 15.94 | 12.70 | 13.99 | 14.42 | 17.79 | 12.98 | 14.30 |
| θ (°) | 5.29 | 2.62 | 1.92 | 2.69 | 2.71 | 1.81 | 2.02 | 2.15 | 2.49 |
| θ/Rku (°) | 0.76 | 0.56 | 0.56 | 0.91 | 0.77 | 0.60 | 0.67 | 0.71 | 1.07 |
| Haze (%) | 35.6 | 13.5 | 13.2 | 7.6 | 12.2 | 8.4 | 8.5 | 10.5 | 9.6 |
| Gloss Value (%) | 23.5 | 51.6 | 44.7 | 67.1 | 50.6 | 60.7 | 45.2 | 55.1 | 59.2 |
| Reflection | ⊚ | ○ | ⊚ | ○ | ⊚ | ⊚ | ○ | ○ | ○ |
| Sparkle | ○ | ○ | ○ | ○ | ○ | ○ | ○ | ○ | ○ |
| Pencil Hardness | 9H | 9H | 9H | 9H | 9H | 9H | 9H | 9H | 9H |

TABLE 2

|  | Comparative Example 1 | Comparative Example 2 | Comparative Example 3 | Comparative Example 4 |
|---|---|---|---|---|
| Air Flow Rate (L/min) | 185 | 155 | 115 | 151.4 |
| Flow Rate of Laminar Airflow ($m^2$/min) | 52 | 52 | 52 | 26 |
| Amount of Application (g/$m^2$) | 6.8 | 6.8 | 6.8 | 5 |
| Amount of Application/ Flow Rate of Laminar Airflow | 0.131 | 0.131 | 0.131 | 0.192 |
| Amount of Application/ Air Flow Rate | 0.037 | 0.044 | 0.059 | 0.033 |
| Ra (μm) | 0.147 | 0.146 | 0.060 | 0.125 |
| Rq (μm) | 0.181 | 0.178 | 0.074 | 0.141 |
| Rt (μm) | 0.723 | 0.837 | 0.354 | 0.605 |
| Rz (μm) | 0.560 | 0.629 | 0.293 | 0.466 |
| \|Rsk\| | 0.30 | 0.39 | 0.64 | 0.70 |
| Rku | 2.31 | 2.73 | 3.03 | 2.14 |
| Rdq | 0.050 | 0.062 | 0.030 | 0.085 |
| RSm (μm) | 32.53 | 35.25 | 18.02 | 18.23 |
| θ (°) | 1.67 | 1.94 | 1.14 | 2.33 |
| θ/Rku (°) | 0.72 | 0.71 | 0.38 | 1.09 |
| Haze (%) | 9.2 | 8.8 | 4.1 | 10.2 |
| Gloss Value (%) | 41.6 | 37.8 | 60.3 | 34.0 |
| Reflection | ⊚ | ⊚ | X | X |
| Sparkle | X | X | ○ | ○ |
| Pencil Hardness | 9H | 9H | 9H | 9H |

Examples 1 to 9 exhibited RSm values from 12.70 μm to 17.79 m, θ values from 1.81° to 5.29°, Rku values from 2.32 to 6.99, and θ/Rku values from 0.56° to 1.07° and, therefore, had less reflection of the background and excellent anti-sparkle properties. In contrast, Comparative Examples 1 and 2 exhibited large RSm values of 32.53 μm and 35.25 μm, respectively, so that sparkling was recognized. Comparative Example 3 exhibited a small θ value of 1.14° and a small θ/Rku value of 0.38°, so that the reflection was confirmed. Comparative Example 4 exhibited a small Rku value of 2.14 and a large θ/Rku value of 1.09°, so that the reflection was confirmed.

INDUSTRIAL APPLICABILITY

The present invention is suitable for a display cover member having less reflection of the background and excellent anti-sparkle properties.

REFERENCE SIGNS LIST

1: cover member

1a: first principal surface

1b: second principal surface

2: uneven surface

10: light-transmissive plate

10a: first principal surface

10b: second principal surface

11: coating film

The invention claimed is:

1. A display cover member comprising:
 a light-transmissive plate including a principal surface; and
 a coating film that covers at least a portion of the principal surface of the light-transmissive plate; wherein
 the coating film has an uneven surface, is made of silicon oxide, contains no scattering particles, and is a homogeneous film;
 a mean width of roughness profile elements (RSm) of the uneven surface defined by JIS B 0601-2013 is not less than 1 μm and not more than 18 μm; and
 a ratio θ/Rku between an average inclined angle (θ) of the roughness profile of the uneven surface and a kurtosis of the roughness profile (Rku) of the uneven surface defined by JIS B 0601-2013 is not less than 0.40° and not more than 1.08°.

2. The display cover member according to claim 1, having a haze of not less than 1% and not more than 50.

3. The display cover member according to claim 1, wherein an arithmetic mean roughness (Ra) of the uneven surface defined by JIS B 0601-2013 is not less than 0.04 μm and not more than 0.25 μm.

4. The display cover member according to claim 1, wherein an absolute value |Rsk| of a skewness of the roughness profile (Rsk) of the uneven surface defined by JIS B 0601-2013 is 2 or less.

5. The display cover member according to claim 1, wherein the coating film covers a whole of the principal surface of the light-transmissive plate.

6. The display cover member according to claim 1, wherein a pencil hardness of the coating film defined by JIS K 5600-5-4-1999 is 6H or more.

7. The display cover member according to claim 1, wherein the light-transmissive plate is formed of a glass plate.

8. The display cover member according to claim 7, wherein the glass plate is formed of a strengthened glass plate.

9. A method for producing the display cover member according to claim 1, the method comprising forming, by spraying on a light-transmissive plate, a coating film forming the uneven surface.

10. The method for producing the display cover member according to claim 9, wherein
 the light-transmissive plate is formed of a glass plate, and
 after the coating film is formed on the glass plate, the glass plate is chemically strengthened.

11. The method for producing the display cover member according to claim 9, wherein a strengthened glass plate is used as the light-transmissive plate.

* * * * *